United States Patent
Hazlewood et al.

(10) Patent No.: US 10,580,066 B1
(45) Date of Patent: Mar. 3, 2020

(54) PERSONALIZING PORTABLE SHOPPING DISPLAYS USING MOBILE DEVICES AND INAUDIBLE TONES

(71) Applicant: Amazon Technologies, Inc., Seattle, WA (US)

(72) Inventors: William R. Hazlewood, Seattle, WA (US); Janet Ellen Galore, Seattle, WA (US); Alaa-Eddine Mendili, Seattle, WA (US); Dominick Khanh Pham, Seattle, WA (US); Jeff Gelfuso, Sammamish, WA (US)

(73) Assignee: Amazon Technologies, Inc., Seattle, WA (US)

( * ) Notice: Subject to any disclaimer, the term of this patent is extended or adjusted under 35 U.S.C. 154(b) by 318 days.

(21) Appl. No.: 15/785,023

(22) Filed: Oct. 16, 2017

(51) Int. Cl.
*G06Q 30/06* (2012.01)
*G06F 3/16* (2006.01)
*G06Q 30/00* (2012.01)
*G06Q 10/08* (2012.01)

(52) U.S. Cl.
CPC ......... *G06Q 30/0643* (2013.01); *G06F 3/167* (2013.01); *G06Q 30/01* (2013.01); *G06Q 30/0631* (2013.01); *G06Q 30/0635* (2013.01); *G06Q 10/083* (2013.01)

(58) Field of Classification Search
CPC ........... G06Q 30/0643; G06Q 30/0635; G06Q 30/0631; G06Q 30/01; G06Q 10/083; G06F 3/167
USPC ..................................... 705/26.7, 26.1, 27.2
See application file for complete search history.

(56) References Cited

U.S. PATENT DOCUMENTS

| | | | | |
|---|---|---|---|---|
| 8,606,638 | B2* | 12/2013 | Dragt | G06Q 20/20 705/17 |
| 2014/0058897 | A1* | 2/2014 | Yang | G06Q 30/0623 705/26.61 |
| 2015/0039496 | A1* | 2/2015 | Shuster | G06Q 20/065 705/39 |
| 2015/0141005 | A1* | 5/2015 | Suryavanshi | H04L 67/125 455/434 |
| 2015/0206210 | A1* | 7/2015 | Liberty | G06Q 30/0601 455/414.1 |

OTHER PUBLICATIONS 2019-03529J, Jan. 2019, Derwent, Webster T.*
Jacobs, Paul E (Inventor). Qualcomm Inc (Assignee); Nov. 1, 2001 "System and Method for Extracting, Decoding, and Utilizing Hidden Data Embedded in Audio Signals"; ; WO 2001082554 A2; retrieved from PQ Dialog on Oct. 18, 2019.*

* cited by examiner

*Primary Examiner* — Yogesh C Garg
(74) *Attorney, Agent, or Firm* — Eversheds Sutherland (US) LLP

(57) ABSTRACT

Systems, methods, and computer-readable media are disclosed for systems and methods for personalizing portable shopping displays using mobile devices and inaudible tones. Example methods may include causing a first inaudible tone to be emitted by a speaker, the first inaudible tone configured to initiate a change in a user interface at a mobile device, determining a second inaudible tone from a user device using a microphone, the second inaudible tone including a user identifier of a user, and determining a user interaction with a product at a product display. Certain example methods may include determining user preference data, and causing presentation of product information for the product using the user preference data.

20 Claims, 10 Drawing Sheets

PERSONALIZING PORTABLE SHOPPING DISPLAYS USING MOBILE DEVICES AND INAUDIBLE TONES

BACKGROUND

Product displays may include products that users can view and, in some instances, purchase. Some product displays, such as vending machines, may have products that can be purchased by users at locations such as train stations, gyms, and other public areas. However, such product displays may have a selection of products that are relatively static over time. For example, vending machines may sell a variety of drinks and snacks that may change, for example, to drinks and snacks from different brands over time. Other product displays, such as those that may be found in stores or malls, may have different product selections over time, but may not be portable. In order to access such product displays, users would have to go to the fixed location of the store or mall. In either instance, or for any other product display, product selection may be based on the availability or the pricing of available products, and the selected products may not be the products desired by users. Accordingly, portable interactive product displays with region-specific products may be desired.

BRIEF DESCRIPTION OF THE DRAWINGS

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. In the drawings, the left-most digit(s) of a reference numeral may identify the drawing in which the reference numeral first appears. The use of the same reference numerals indicates similar, but not necessarily the same or identical components. However, different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Overview

Figure 1:
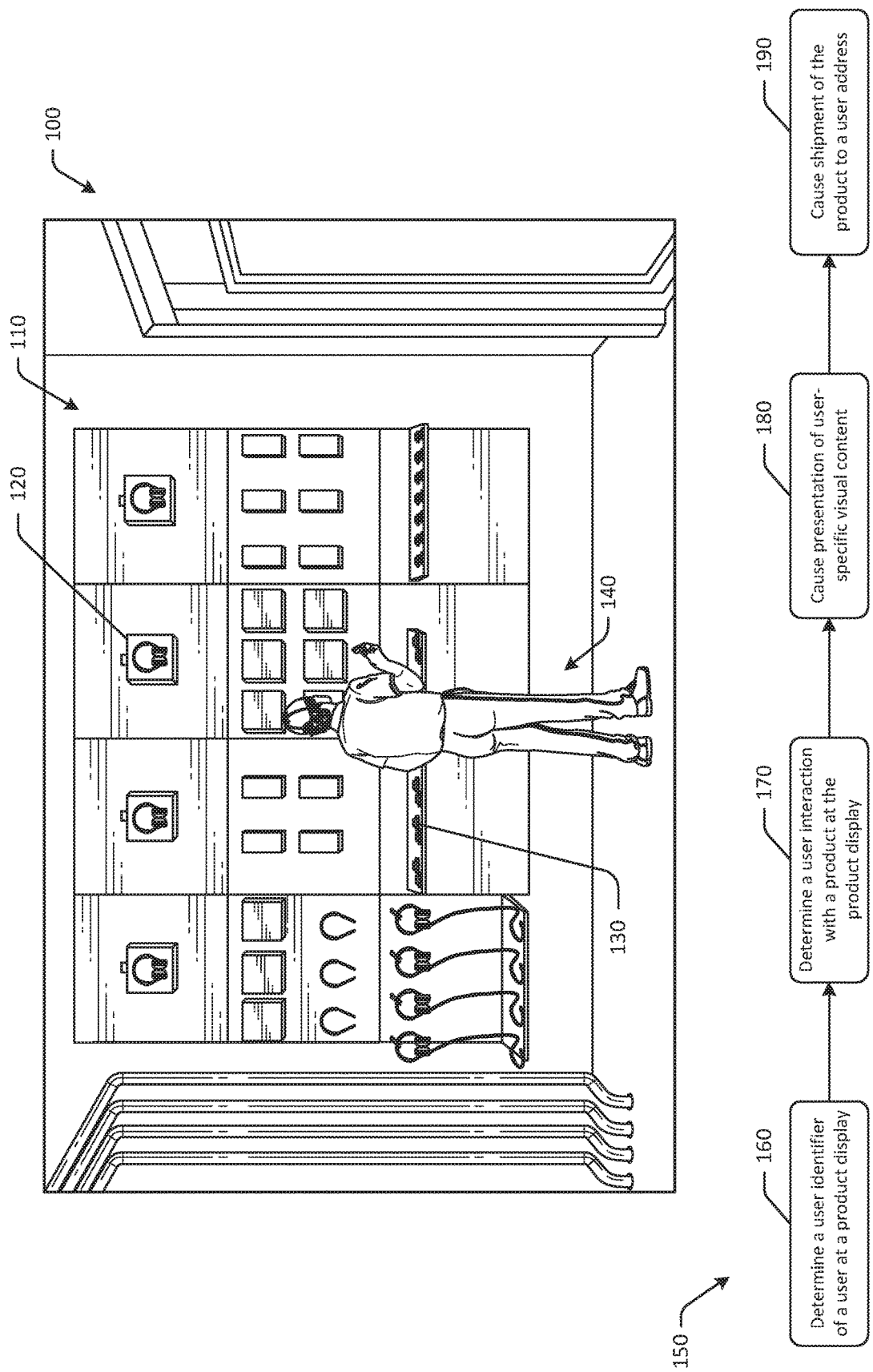
FIG. 1 is a schematic illustration of an example use case for portable interactive product displays with region-specific products in accordance with one or more example embodiments of the disclosure.

Product displays may be used to present products to users for the users to view the products, learn more about the products, make purchases, and so forth. Product displays may be positioned at different locations, and the locations may impact the amount of user engagement with the product display and the products at the product display. For example, a product display near a bus stop or at a train station in a major city may have a higher level of exposure or increased user engagement relative to a product display outside a convenient store in a remote area. In addition, users that interact with the product display or products at the product display may be more interested in certain products than other products. For example, users that interact with a product display at an airport may be more interested in headphones than guitars or televisions. In addition, product-specific features, such as product colors, pricing, brands, etc. may vary in different geographic locations. For example, in certain neighborhoods, such as in Midtown in Atlanta, users in general may prefer Intelligentsia brand coffee, whereas in Buckhead in Atlanta, users in general may prefer Counter Culture brand coffee. In other examples, users in particular regions or areas may have generally similar preferences as to various product features. In addition, a user may interact with products or a product display and may decide that the user would like to purchase a product, either then and there or for delivery to a location. Users may desire to engage with the products or product displays at any time, and therefore, product displays may be unmanned, so as to have functionality at all times without the presence of a human or operator.

Embodiments of the disclosure include systems and methods for portable interactive product displays with region-specific products. Certain embodiments may include portable product displays that can be quickly assembled and disassembled, and can be moved to different locations. Products selected for presentation at the product displays may be selected based at least in part on local user preferences, such as user preferences of users residing within a predetermined distance of the location of the product display. The products featured at the product displays may be rapidly or periodically changed or replaced, so as to have a product selection that is relevant to users (e.g., local sports teams events, local community events, holidays, seasons, time of day, etc.) that may interact with the product displays. For example, during a morning rush, product displays may have coffee beans and other coffee equipment featured, while at an evening rush, the same product displays may have gift cards for dinner restaurants or ready-to-go meals featured. In selecting any products for presentation at product displays, local user preferences may be used in order to determine which products, or which types of products are presented at a particular display. The location of the product display may also be considered in product selection.

Product displays may be autonomous and may therefore be operational all times of day. Product displays may include functionality such as facilitating the purchase of products at the product display, arranging for shipment of products to user addresses, and other functionality. Some embodiments may actively identify users or user devices that are within a distance of the product display. Based at least in part on identified users or user devices, some embodiments may present customized digital content to the user at the user device (e.g., via a mobile application or webpage, etc.) or at a display device of the product display. The customized digital content may include welcome notifications, alternate product colors or product selections based at least in part on the specific user's preferences, and so forth. Users may not have to actively identify themselves when interacting with products or the product display, or when making purchases. For example, some embodiments may use inaudible tones or sensors to detect user devices and/or identify users. Inaudible tones may have frequencies between about 18 kHz and about 20 kHz. Inaudible tones may include ultrasonic audio as a communication protocol that uses inaudible sound to transmit information. Transmitted sound may include streams of data that can be used to determine proximity, cause devices to execute certain actions, and the like. Inaudible tone analytics can be used to determine a number of unique tones heard, a total number of tones heard by a platform, and so forth. Tone data can be viewed over specified date ranges to measure explicit product wall analytics. User interactions with physical products or with product displays may be merged or integrated with digital user interactions, such as digital or online browsing histories, purchase data, and other user interaction data. The combined digital and physical user interaction history may be used for product recommendations, advertisements, and so forth.

This disclosure relates to, among other things, devices, systems, methods, computer-readable media, techniques, and methodologies for portable interactive product displays with region-specific products. Certain embodiments may include product displays that are interactive and that include region-specific products selected for presentation based at least in part on local user preferences. Some embodiments may automatically identify users and may track user movement and interaction with products at a product display, and may determine user interactions at the product display. User interactions at the product display may be integrated with or added to a digital browsing history or digital user interaction data associated with a user account of the user. Certain embodiments may use inaudible tones, cameras, and/or sensors to detect or identify users, track movements and interactions, and so forth.

Referring to FIG. 1, an example use case 100 for portable interactive product displays with region-specific products is illustrated in accordance with one or more embodiments of the disclosure. A portable interactive product display 110 may a product display that a user 140 can interact with. The portable interactive product display 110 may have one or more products that can be interacted with by users. In some instances, users may be able to interact with products at the portable interactive product display 110 by physically touching and/or removing the products from the portable interactive product display 110. In other embodiments, the products may be interacted with by users with interactions such as reading or viewing product information, pricing, placing orders, and so forth.

The portable interactive product display 110 may be formed of, in one example, kerfwall panels or walls formed of another material that have various dimensions, and can include product display areas, such as cubbies, drawers, lockers, hooks, and the like. The portable interactive product display 110 may include modular shelfing to accommodate products of various sizes, and may include one or more electronic components, such as display devices, microphones, speakers, computer systems, wireless communication components (e.g., WiFi components, NFC components, BLUETOOTH components, etc.), sensors (e.g., weight sensors, motion sensors, proximity sensors, etc.), cameras, and other electronic components that can be used to identify users, determine user locations, determine user interactions, determine user intent, facilitate purchases and/or delivery of products, and other functionality.

The portable interactive product display 110 may be portable in that the product display may be movable from one location to another, so as to provide a boutique-like shopping experience for users at various locations. For example, the portable interactive product display 110 may be positioned at an airport, a bus stop, a train station, along a sidewalk, near a local shopping center, in a mall, or any other suitable location. In some embodiments, the portable interactive product display 110 may be unmanned, so that users can engage or interact with the portable interactive product display 110 at any time. For example, purchases may be made at any time at the portable interactive product display 110 without the need of a human or an operator being present.

Products at the portable interactive product display 110 may be for sale to users. In some embodiments, users may purchase a product at the portable interactive product display 110 and immediately remove the product from the portable interactive product display 110. In other embodiments, users may decide to purchase a product at the portable interactive product display 110, and may have the product shipped or delivered on-demand to an address selected or provided by the user. Accordingly, if a user purchases a large item such as a television or a guitar, the portable interactive product display 110 may cause delivery of the product to an address designated by the user. In some embodiments, users may have the option of removing a product from the portable interactive product display 110, retrieving the product from a nearby distribution center or fulfillment center (e.g., lockers, etc.), or selecting a delivery option. The portable interactive product display 110 may thus initiate a purchase transaction and/or cause delivery of a shipment of the product to the user designated address.

The portable interactive product display 110 may dynamically identify and/or engage with users via a display device at the portable interactive product display 110, or via a user device, such as a smartphone, glasses, goggles, smartwatch, tablet, or other device. For example, as a user approaches the portable interactive product display 110, the user and/or the user device may be identified. In some embodiments, a welcome message may be presented at the user device or at a display device at the portable interactive product display 110. For example, one or more lights may be modified or activated to welcome the user, and a "welcome, user!" message may be presented to the user. As the user interacts with the portable interactive product display 110 or products at the display, personalized information may be presented to the user. For example, if the user prefers black athletic shoes, but the shoes the user is interacting with at the portable interactive product display 110 are blue, an image or video of the same shoes in black may be presented to the user. Such personalized information may be determined based at least in part on a user profile or user preference information associated with the user identifier.

To identify users, embodiments may use facial recognition technology, user device information, and the like. For example, as a user approaches the portable interactive product display 110, one or more computer systems at the portable interactive product display 110 may communicate with a user device that the user has, and cause the user device to, for example, prompt the user for information by presenting a certain user interface at the user device, or changing a user interface at the device, or may cause the user device to automatically send information, such as a device identifier or a user identifier, to the computer system. Using this information, the user may be identified, along with any available user preference data, shipping addresses, payment information, and the like. In some embodiments, wireless communication between a computer system at the portable interactive product display 110 and a user device may be via inaudible tones or another local communication protocol, and can also be used to determine user positioning and/or user interactions with various products, as described herein. Certain embodiments may use GPS positioning and other location based data to determine user positioning, user identification, and user interactions in addition to, or instead of, wireless communication protocols.

The products presented at the portable interactive product display 110 may be selected for presentation based at least in part on a location of the portable interactive product display 110 and/or a region or area around the location of the portable interactive product display 110. For example, products that users residing in, or frequently traveling through, the area may find interesting or desirable may be selected for presentation at the portable interactive product display 110. Each portable interactive product display may have its own unique selection of products that is tailored to users that are likely to interact with the portable interactive product display. In some instances, product features, such as product colors, brands, price points, etc. may be selected based at least in part on local user preferences. Local users may include users that have home or work addresses within a certain distance or radius of the portable interactive product display 110, users that frequently pass near the portable interactive product display 110, users associated with addresses within a distance of the portable interactive product display 110, and so forth. As a result, the portable interactive product display 110 may have products that are likely to be found interesting and/or desirable by users that are likely to come across or interact with the portable interactive product display 110.

The location of the portable interactive product display 110 in the example of FIG. 1 may be used to select products in some embodiments. For example, the portable interactive product display 110 may be positioned at an airport, and may therefore have products that users may desire at an airport, such as headphones, neck pillows, magazines, and the like. For portable interactive product displays positioned at other locations, such as a train station, products may be different, such as ready-to-go dinner meals that can be ordered for on-demand delivery to a user's home.

As users interact with the portable interactive product display 110, the user interactions can be captured and used to augment or modify, or may be used in conjunction with, a digital user interaction history that may include digital interactions associated with the user has performed. Digital interactions may include browsing session data, product clicks or selections, selecting product reviews, lengths of time a user spent at various webpages or product information pages, purchase histories, clickstream data, voice interaction data, and other digital interactions. The physical interactions users have with portable interactive product displays may be determined and stored. In some embodiments, the physical user interaction data may be combined with the digital user interaction data or may be separately stored in a database. The physical user interaction data may be used in conjunction with digital user interaction data for product recommendations, advertisements, and so forth. Products that a user interacts with at portable interactive product displays may be added to a mobile application for later access or interaction by the user.

Product displays may be configured for users to implement a physical version of share-with-others. For example, users may share products on social media, send product display physical location data to friends, share a digital version of a wall or product display product selection, share a digital video short, and so forth. Users may physically tap a button or other mechanism to "heart" a product or display wall.

User interest levels in products at product displays may be determined using, for example, one or more sensors (e.g., distance, NFC, beacons, computer vison, etc.). Display devices at the product displays may change visuals based on the perceived intent (e.g. a customer is inspecting a specific product, or a customer is browsing from a distance, etc.), and may inform users of additional information and shopping options.

In the example of FIG. 1, the portable interactive product display 110 may be part of a system that includes the portable interactive product display 110 and one or more computer systems, such as one or more remote server(s). The remote server may be positioned at the portable interactive product display 110, or may be wirelessly connected to a computer system at the portable interactive product display 110. In some embodiments, the computer system may be the remote server. The portable interactive product display 110 may be positioned at an airport.

The portable interactive product display 110 may be a portable interactive display wall that includes a first product display portion and a second product display portion. Any number of product display portions may be included. The first product display portion may include a pair of headphones 120. The pair of headphones 120 may be a first product positioned in the first product display portion, and may be accessible for interaction by the user 140. The second product display portion may include various earphones 130. The earphones 130 may be a second product positioned in the second product display portion, and may be accessible for interaction by the user 140. In some embodiments, the user 140 may be automatically identified, or asked to identify themselves, for example via a user device, before being able to physically contact or touch the products, while in other embodiments, the user 140 may be allowed to contact the products without identification. In some embodiments, the user 140 may be able to interact with products through a display, such as a glass case, etc. The portable interactive product display 110 may include a display device configured to present visual content.

The remote server and/or computer system may include at least one memory that stores computer-executable instructions and at least one processor configured to access the at least one memory and execute the computer-executable instructions to perform various actions or operations, such as one or more of the operations in a process flow 150 of FIG. 1.

At block 160 of the process flow 150, the remote server may determine a user identifier of a user at a product display. For example, as the user 140 approaches the portable interactive product display 110, the user 140 may have a user device that sends a user identifier or device identifier to the remote server. In some embodiments, the user device may send the identification information in response to a request, or automatically. For example, the user device may have a mobile application that uses location data and geofencing to determine that the user device is in a certain geofenced area, and as a result, may automatically send identification data to the remote server. In some embodiments, the identification data may be sent using one or more inaudible tones or other wireless communication protocols. Based at least in part on the identification data, the user identifier may be determined. A distance between the user and/or the user device and the portable interactive product display 110 may also be determined, for example, using a volume of an inaudible tone, cameras, proximity sensors, motion sensors, and so forth. The user 140 may therefore be determined to be at or near the display, as opposed to simply walking past or gazing from afar.

At block 170, the remote server may determine a user interaction with a product at the product display. For example, the portable interactive product display 110 may determine, based at least in part on input from one or more electronic components at the portable interactive product display 110 or inputs from the user device, that the user 140 read or viewed a product description, requested more information, read or viewed product reviews, picked up a product, looked at a product, and so forth, as well as chronological information including lengths of time that a user spent with any particular product. The remote server may store product identifier information and user interaction information in a database, along with the user identifier. In the example of FIG. 1, the remote server may determine that the user 140 tried on the earphones 130. User interactions with products may be determined, for example, using NFC tags, Bluetooth beacons that can sense tapping or proximity to a user device, using MEMS microphones to listen for sounds emitting from a user device, by a user taking a photo of the product, and so forth.

At block 180, the remote server may cause presentation of user-specific visual content. For example, user-specific or personalized visual content may include visual content related to a product the user 140 interacted with, products in different colors or brands based on user preferences, welcome messages, product or user account information, and so forth. In some embodiments, the user-specific visual content may be presented at the user device, while in other embodiments, the user-specific visual content may be presented at a display device positioned at or associated with the portable interactive product display 110. In the example of FIG. 1, the remote server may cause an option to purchase the earphones 130 to be presented at a user device. The user 140 may select the option to purchase.

At block 190, the remote server may cause shipment of the product to a user address. For example, the user 140 may complete a purchase transaction using the user device, and the remote server may cause or facilitate the purchase transaction and/or cause or initiate a shipment or delivery of the earphones 130 to a user address, such as a home address or a hotel address. In some embodiments, the user 140 may be provided an option to remove the earphones 130 from the portable interactive product display 110 immediately, and no product may be delivered.

In some embodiments, purchases at the portable interactive product display 110 may be processed by determining or receiving a request to purchase the first product, or the earphones 130, from the user device. The request may be associated with the user identifier of the user 140. The remote server may determine that the user 140 associated with the user identifier is present at the portable interactive product display 110, such as based at least in part on a location of the user device of the user 140. The remote server may cause presentation of a selectable option for the user 140 to take the first product from the portable interactive product display 110. The option may be presented at the user device or at a display device associated with the portable interactive product display 110. The remote server may either determine that the first product has been removed from the portable interactive product display 110, or alternately the remote server may cause shipment of the first product to an address associated with the user identifier.

Embodiments of the disclosure may include portable interactive product displays with region-specific products, and may include voice processing/speech recognition systems and user identification systems. Such systems may employ techniques to identify users without any, or with limited, user action, such as identification of users or user devices using inaudible tones. Product displays may include display devices that can present content customized to certain users, and may include additional functionality, such as facilitating purchase transactions and/or causing delivery of packages or shipments to user addresses.

The systems, methods, computer-readable media, techniques, and methodologies for portable interactive product displays with region-specific products may therefore provide unmanned product displays that can facilitate product transactions at any time and may automatically identify users. As a result of improved functionality, users may interact with products or product displays that are relevant to the user and/or the user's location.

Example embodiments of the disclosure provide a number of technical features or technical effects. For example, in accordance with example embodiments of the disclosure, certain embodiments of the disclosure may automatically identify users and may detect or determine physical or real-world user interactions with products or product displays. For example, a length of time that a user viewed a product may be determined. This information may be combined with a digital browsing or user interaction history and used to provide improved product recommendations and/or advertisements to specific users. As a result, users may have increased options of purchasing products that are relevant to the user and/or the user location, and may physically interact with products or product displays. Embodiments of the disclosure may increase product awareness and may provide products that are relevant to users that interact with the product displays. The above examples of technical features and/or technical effects of example embodiments of the disclosure are merely illustrative and not exhaustive.

One or more illustrative embodiments of the disclosure have been described above. The above-described embodiments are merely illustrative of the scope of this disclosure and are not intended to be limiting in any way. Accordingly, variations, modifications, and equivalents of embodiments disclosed herein are also within the scope of this disclosure. The above-described embodiments and additional and/or alternative embodiments of the disclosure will be described in detail hereinafter through reference to the accompanying drawings.

Illustrative Process and Use Cases

Figure 2:
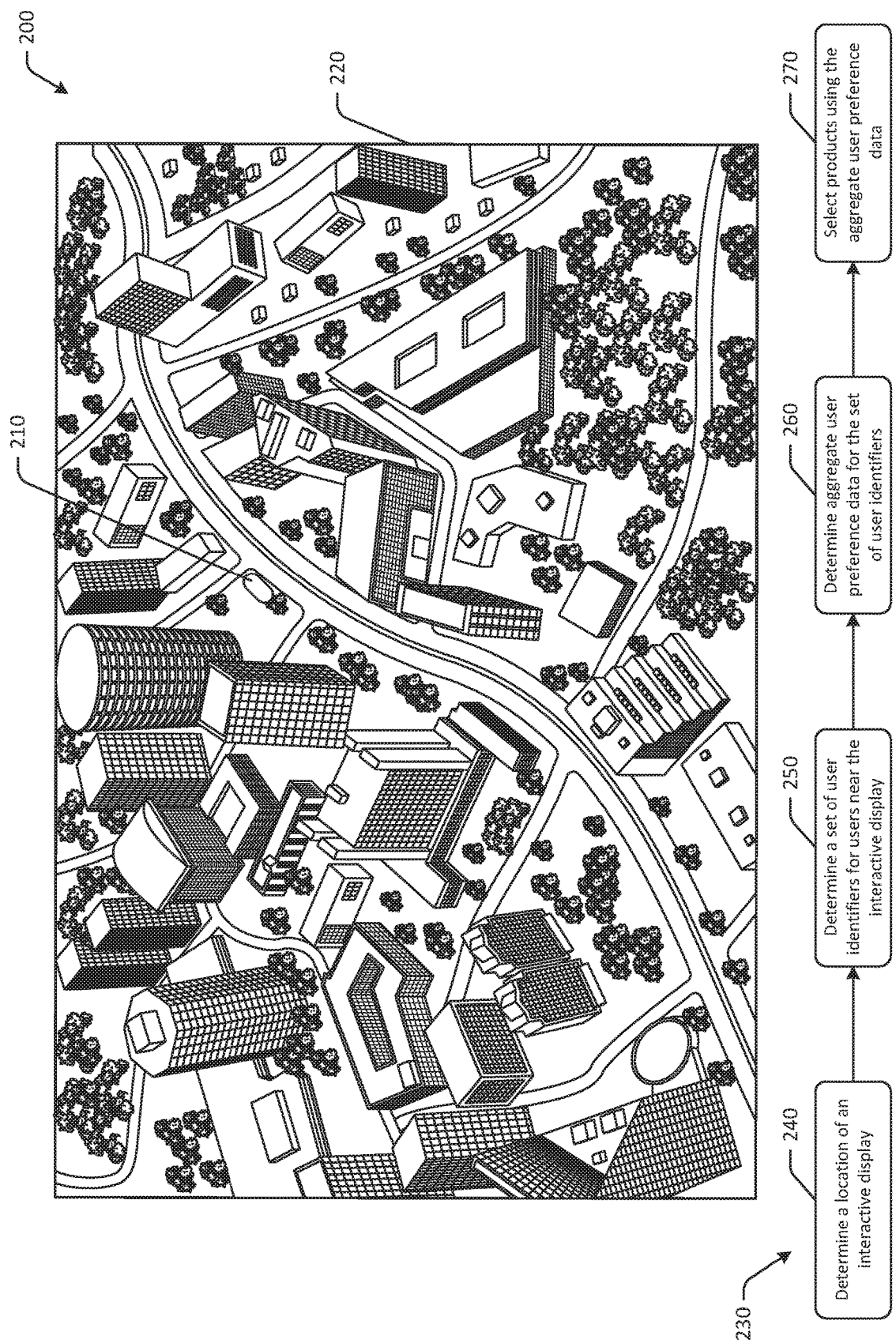
FIG. 2 is a schematic illustration of an example use case and process flow for product selection and product display location in accordance with one or more example embodiments of the disclosure.

FIG. 2 is a schematic illustration of an example use case 200 and process flow 230 for product selection and product display location in accordance with one or more example embodiments of the disclosure.

In FIG. 2, a product display 210 may be positioned along a walkway or at a bus or streetcar stop. The product display 210 may be a portable and/or interactive product display, and may be configured for autonomous interactions with users. For example, users passing by the product display 210 may be able to interact with the product display 210 and/or products at the product display 210. The product display 210 may be configured to identify users, determine purchases, provide products, order deliveries, and so forth.

The products at the product display 210 may be selected based at least in part on a location of the product display 210. For example, the location of the product display 210 may be a bus stop, and products selected for presentation at the product display 210 may therefore be different than products that may be selected for a product display at a hospital waiting room, for example.

The location of the product display 210 may be used to determine user preferences for users that are likely to interact with the product display 210. For example, users that reside near the product display 210, or that ride the buses that come to the bus stop, may be likely to interact with the product display 210. Accordingly, aggregate user preferences for products may be determined to select products for presentation at the product display, as well as specific product features, such as colors, for the products presented at the product display 210.

For example, to select products for presentation at the product display 210, at block 240 of the process flow 230, one or more remote servers or computer systems may be executed to determine a location of an interactive display. For example, a location of the product display 210 may be determined. The location may be determined using a zip code, GPS coordinates, city names, neighborhood names, or another location identification scheme. In some embodiments, product display interaction types may be determined based at least in part on the location of the interactive display. For example, in areas subject to high crime rates or theft, the product interaction types may not include interactions such as touching or picking up products, whereas in other areas, products may be accessible for physical interaction with users prior to purchasing.

At block 250, one or more remote servers or computer systems may be executed to determine a set of user identifiers for users near the interactive display. For example, user identifiers of users with home or work addresses within a predetermined distance, range, or radius of the product display 210 may be determined. The predetermined distance may be, for example, the area captured in the boundary 220, or an area surrounding the product display 210. In an example, user identifiers associated with addresses within 5 miles of the product display 210 may be determined. In another example, user identifiers associated with commutes or travel routes or residence times near or within the predetermined distance may be identified. In another example, the product display may be positioned in an apartment building, and user identifiers of users in the apartment building may be determined.

At block 260, one or more remote servers or computer systems may be executed to determine aggregate user preference data for the set of user identifiers. After the set of user identifiers is identified, a number of user identifiers with certain preferences may be determined. Aggregate user preference data may include most popular colors, most popular product categories (e.g., electronics, books, home & garden, etc.), demographic information, household information, and so forth. User preference data may be determined based at least in part on user identifier and/or user profile information, aggregate user interaction data, purchase histories, browse histories, and so forth.

At block 270, one or more remote servers or computer systems may be executed to select products using the aggregate user preference data. For example, a set of product identifiers of products to be positioned at the product display 210 may be determined based at least in part on the aggregate user preference data. In some embodiments, products may be selected from a set of candidate products, where the aggregate user preferences are used to determine the strongest match between targeting criteria associated with the candidate products and the aggregate user data. In another instance, products may be selected based at least in part on a number of user identifiers that match demographic information associated with a product. For example, if a product is associated with demographics of 21 to 34-year-old males and targeting criteria of early technology adopters, and the set of user identifiers includes 5,000 user identifiers matching the targeting criteria and demographics, the product may be selected for presentation. Other thresholds may be used. In other embodiments, percentages of the user identifiers may be used to select products (e.g., 56% female, 40% professionals, etc.). The percentages may be used in conjunction with targeting criteria to select products for presentation at the product display 210.

In some embodiments, products for display may be selected from a set of candidate products (or a set of product identifiers corresponding to the products). For example, a set of candidate products for the product display may be determined. The set of candidate products may include a first product and a second product. Respective targeting criteria for the first product and the second product may be determined. A first number of user identifiers that satisfy the first targeting criteria for the first product may be determined. A second number of user identifiers that satisfy the second targeting criteria for the second product may be determined. One or both the first product and the second product may be selected for presentation at the product display based at least in part on the first number of user identifiers and the second number of user identifiers, respectively.

In some embodiments, product features of selected products may be selected based at least in part on aggregate user preference data. For example, using the aggregate user preference data, a most popular color may be determined to be a first color, such as black. The color may be specific to clothing or another product category. Accordingly, a clothing product selected for presentation may be selected in the first color, or black, in this example.

Products may be selected based at least in part on local events, such as festivals, sports events or teams, seasonality, and the like. For example, a special occasion may be determined to be occurring within a time interval, such as within a week or a few hours. The special occasion may be determined from local news and/or calendar information. Products selected for presentation may be determined based at least in part on the special occasion. In another example, local events such as farmer's markets may have corresponding product selections that can be preset groups or collections of products, such as an assortment of handmade products, locally sourced food products, and the like. Products may be refreshed or replaced periodically, such as hourly, daily, weekly, or at irregular time intervals. Products may also be curated or selected based at least in part on input from influencers and experts (e.g., local celebrities, etc.), geographical data (e.g., customers in a neighborhood prefer raincoats to umbrellas, etc.), specific product verticals (e.g., handmade products, etc.), and so forth.

Figure 3:
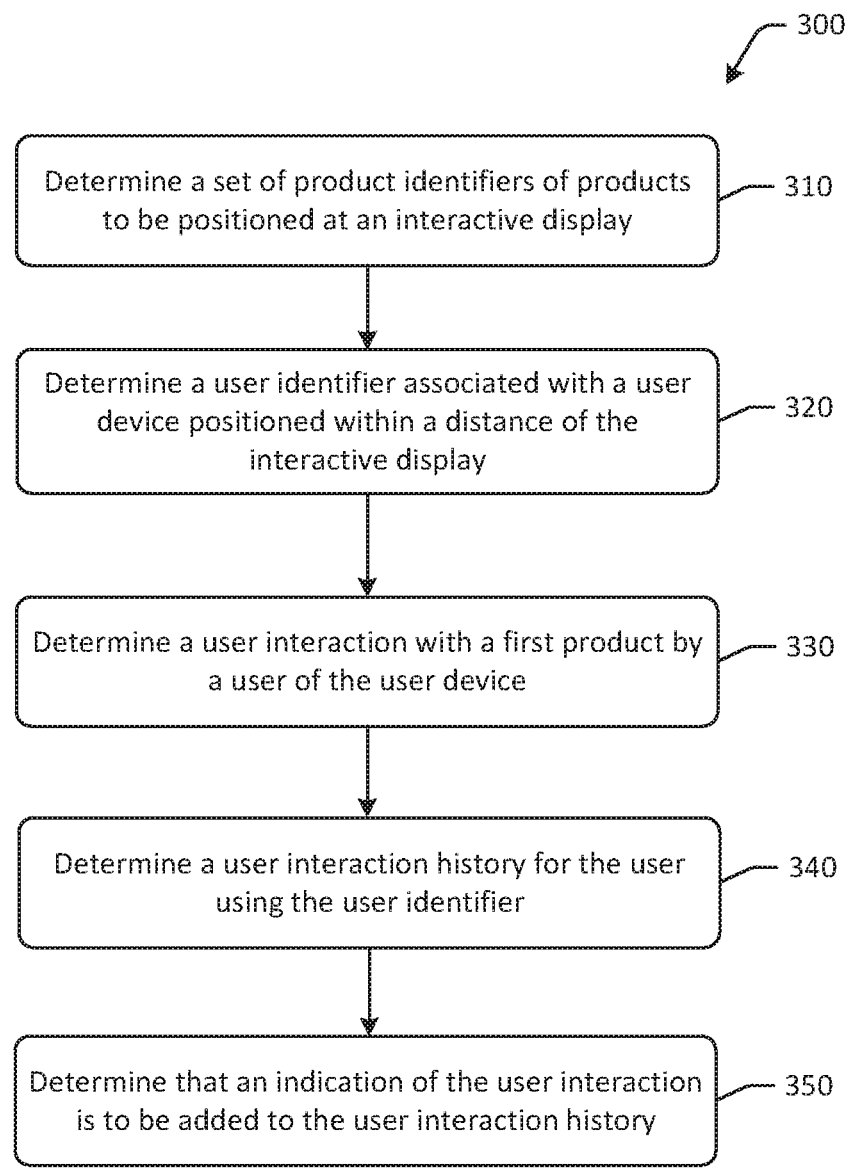
FIG. 3 is a schematic illustration of an example process flow for product selection and modification of user interaction data in accordance with one or more example embodiments of the disclosure.

FIG. 3 depicts an example process flow 300 for product selection and modification of user interaction data in accordance with one or more example embodiments of the disclosure. While example embodiments of the disclosure may be described in the context of portable interactive product displays, it should be appreciated that the disclosure is more broadly applicable to any suitable product displays. Some or all of the blocks of the process flows in this disclosure may be performed in a distributed manner across any number of devices. The operations of the process flow 300 may be performed in a different order.

At block 310 of the process flow 300, computer-executable instructions stored on a memory of a device, such as a remote server or a user device, may be executed to determine a set of product identifiers of products to be positioned at an interactive display. For example, a remote server may determine a location of a product display, where the location is indicative of the physical location at which the product display is positioned, or is to be positioned. The location may be determined based at least in part on GPS coordinates, zip code, street address, nearby landmarks, or other formats indicative of the location of the product display.

The location of the product display may be used to determine user profiles or user identifiers of users that are located near the product display. For example, the remote server may determine user identifiers of users having home addresses or work addresses within a predetermined distance, such as 1 mile or 5 miles, from the location of the product display. In another example, the remote server may identify user identifiers for users that have commutes that pass within a distance the location of the product display, or that spend a certain amount of time (e.g., as determined using a user device associated with the user identifier, etc.) within a distance of the product display. The distances may be the same or different for each particular set of users. For example, for users that have commutes with routes that pass near the product display, the distance between the respective commute route and the product display may be 100 feet, whereas for users that spend time in a certain neighborhood, the distance may be a half mile, etc.

Based at least in part on the set(s) of identified user identifiers, the remote server may determine a set of product identifiers for positioning at the interactive display. For example, candidate products may be associated with various targeting criteria. The products that have the most amount of targeting criteria satisfied by the identified set(s) of user identifiers may be selected for presentation at the display. For example, if a product has targeting criteria of an age range of 21-34 years old, a gender of male, and a household income of $50,000, and the average or aggregate demographic information of the identified set(s) of user identifiers satisfies most or all of the targeting criteria, the product may be selected for presentation. In some embodiments, candidate products may be ranked based at least in part on the demographics of the determined user identifiers, and selected based on rank. In other embodiments, products may be selected based at least in part on products popular with the identified users. For example, if a certain number of users in the region or area (as determined by distance from the product display, or zip code, etc.) have a certain product on their digital wish list or in their digital shopping carts, the product may be selected for presentation at the product display regardless of whether or not it is a candidate product. In some embodiments, product types and/or product features may be selected based at least in part on aggregate or average user preferences. For example, if a pair of headphones is selected for presentation, regardless of whether the selection was based on the local user data, the color of the headphones or the brand of the headphones that are presented may be determined based at least in part on the local user preferences. Other product features that may be determined based at least in part on local preferences include price points, functionality, and so forth. In some embodiments, one or more aspects of the selected products may be determined based at least in part on local user preferences, while in other embodiments, the products themselves, in addition to product aspects, may be selected based at least in part on local user preferences.

Product selection may also be determined based at least in part on the location of the product display. For example, product displays at train stations may include books, headphones, chargers, snacks, and so forth, for items that may be useful or desired by users on trains. In contrast, product displays at bus stops or on major streets may include televisions, coffee machines, and other items that users may desire, and that can be sent to the user's address.

At block 320 of the process flow 300, computer-executable instructions stored on a memory of a device may be executed to determine a user identifier associated with a user device positioned within a distance of the interactive display. For example, a product display may be located at a bus stop. A user may be at the bus stop and may approach the product display. As the user approaches, one or more sensors and/or components may be used to identify the user. For example, a camera may be used to capture a facial image, which may then be processed to determine whether a matching user identifier is known. In another example, inaudible tones may be used to communicate with a user device that the user has, and can be used to cause the user device to send a device identifier and/or a user identifier to the remote server or another device at the product display. Based at least in part on a volume of inaudible tones received from the user device, the distance between the user device and the product display may be determined. At different distances, the product display may cause different actions to occur. For example, if a user is interacting with the product display, a customized message may be presented at the user device or at a display device of the product display, whereas if the user is merely browsing from afar, a different action, such as changes in lighting schemes, may be implemented.

At block 330 of the process flow 300, computer-executable instructions stored on a memory of a device may be executed to determine a user interaction with a first product by a user of the user device. User interactions may be determined, for example, using one or more sensors or components. For example, user interactions may be determined using one or more cameras (e.g., depth sensors or depth cameras, RGB cameras, etc.) and computer vision processing, weight or force sensors, inaudible tones, and other sensors. In one example, one or more cameras may be used to determine user interactions such as viewing or gazing at a product, reading a product description, and the like. In another example, a weight sensor may be used to determine that an object or a product was removed from the product display by detecting a change in weight measurement. In another example, inaudible tones may be used to send data to particular microphones or with certain indications of products that the user is viewing or interacting with. In some embodiments, a user may interact with an application on the user device that presents additional information regarding a product at the product display.

At block 340, computer-executable instructions stored on a memory of a device may be executed to determine a user interaction history for the user using the user identifier. For example, a user account or a user profile associated with the user identifier may be determined using a database. The user account or the user identifier may be associated with a user interaction history that includes digital user interactions. For example, a browsing history for the user may be include in the user interaction history, as well as clickstream data, products added to a cart, purchase data for previous purchases, and other information may be included in the user interaction history.

At block 350, computer-executable instructions stored on a memory of a device may be executed to determine that an indication of the user interaction is to be added to the user interaction history. The physical user interaction with the product may be captured and merged with the user interaction history. For example, an indication that the user read a product description, or added a product to a digital shopping cart, at the product display may be added to the user interaction history. In some embodiments, the physical user interaction data may be maintained separate from the digital user interaction history, while in other embodiments, the digital user interaction history may be modified to include the physical user interaction data. As a result, product recommendations, promotional offers, advertisements, and other content may be targeted to the user with increased relevancy to the user's interests, intent, and/or desires.

Figure 4:
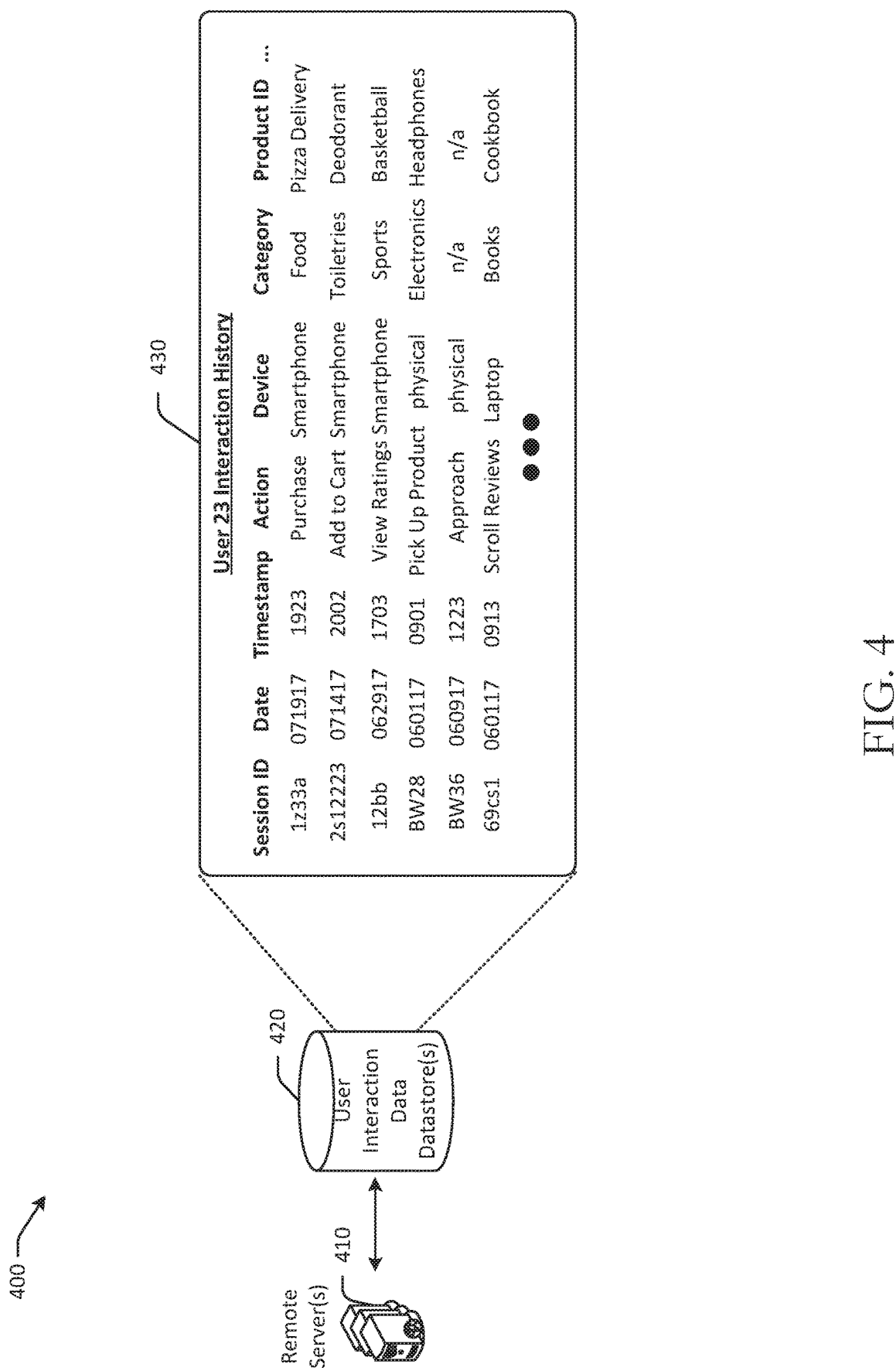
FIG. 4 is a schematic illustration of example user interaction data with digital and physical interaction integration in accordance with one or more example embodiments of the disclosure.

FIG. 4 depicts example user interaction data with digital and physical interaction integration in accordance with one or more example embodiments of the disclosure. In FIG. 4, an example system 400 may include one or more remote servers 410 in communication with one or more user interaction data datastore(s) 420. The user interaction data datastore(s) 420 may include user interaction data for specific user interactions linked to or associated with respective user identifiers. For example, user interaction history data 430 for a particular user "User 23" may be stored at the user interaction data datastore(s) 420. The user interaction history data 430 may include historical user interaction data related to digital and/or physical user interactions associated the user identifier. For example, digital user interactions such as clicks, tapes, swipes, or other product selections, as well as detail page views, product review views, product rating views, add to carts, purchases, audio data consumption, and other user interactions may be stored in the user interaction history data 430. In addition, physical user interaction data, such as user interactions at product displays, may be captured and stored in the user interaction history data 430 or in a separate database and/or datastore. In the example of FIG. 4, the user interaction history data 430 may include both physical and digital user interaction data, and may merge the data in a chronological order. The combined data may be used to generate accurate product recommendations, promotional offers, and the like for the user. For example, the user interaction history data 430 may include purchase data for a food delivery (e.g., Prime Restaurants, etc.), data regarding an approach to a product display, data related to a product that the user picked up at a product display, and so forth.

Figure 5:
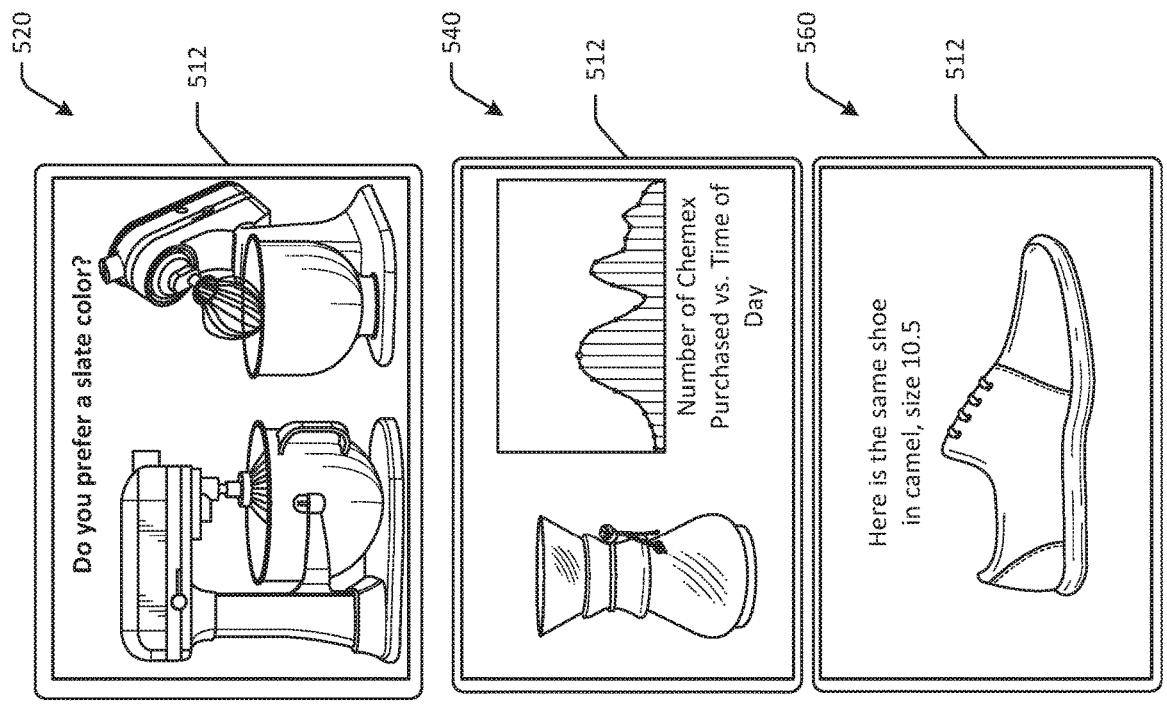
FIG. 5 is a schematic illustration of an example portable interactive product display in various states in accordance with one or more example embodiments of the disclosure.
Figure 5:
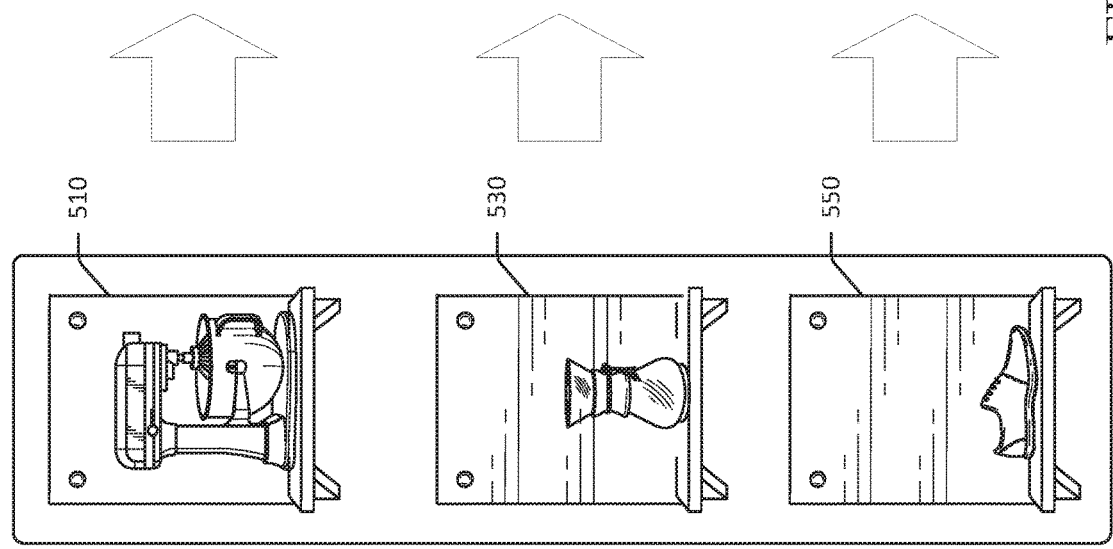

FIG. 5 depicts an example portable interactive product display in various states in accordance with one or more example embodiments of the disclosure. In the example of FIG. 5, a product display 500 may include a number of products. The product display 500 may include a display device 512, such as a monitor, a television, a smartboard, a glass or plastic display, a projector, or another display device. The display device 512 may be used to present visual content, such as images, videos, and the like.

As users interact with the product display 500, certain visual content may be presented at the display device 512. In addition, when there are no users interacting with the product display 500 and/or any of the products at the product display 500, the display device 512 may be operable in various states, such as an "attract mode" to attract users by providing information such as product offerings, discounts, prices, etc., or a user identification mode that may provide visual content that may be relevant to nearby users. Other modes may include an interaction mode that may include spotlights or other lighting or audio/visual responses to user interactions. For example, the product display 500 may provide feedback to user interactions, such as by increasing the brightness of a light focused on a product that the user is viewing, and the like. In another example, lighting or visual content may be modified based at least in part on user interactions with the product display 500 or products at the product display 500. Other states or modes may be used.

For example, in FIG. 5, if a user interacts with a food mixer 510 at the product display 500, information related to the food mixer 510 may be presented at the display device 512 at a first instance 520. For example, a video of the food mixer 510 in action, or on a food television program, or in a different color may be presented. In a particular example, a user may interact with the food mixer 510 at the product display 500. The user identifier for the user may be determined. Using the user identifier, a purchase history for the user may be determined to include a toaster over in a slate color. The color of the food mixer 510 at the product display may be determined to be red. Because the user may have a determined user color preference for kitchen products in slate, as determined based at least in part on the user's purchase history, the food mixer 510 may be presented in a slate color at the display device 512. As a result, the user can be presented with what the food mixer 510 may look like in a different color. The user may then make a purchase of the food mixer 510 in a desired color. In some embodiments, visual content may be provided at the user device instead of, or in addition to, the display device 512.

In another example, a user may interact with a chemex coffee maker 530 at the product display 500. The user may, for example, pick up the chemex coffee maker 530 or request additional information. Related visual content may be presented at the display device 512. For example, an interesting graph or witty comment may be presented. In the example of FIG. 5, a graph depicting the volume of chemex coffee makers sold at various times throughout the day may be presented at a second instance 540, which may indicate that users prefer to buy the chemex coffee maker in the morning and/or during afternoon coffee breaks.

In another example, a user may interact with a shoe 550 at the product display 500. The user may be identified and a shoe size of the user may be determined based at least in part on previous purchases or user interactions. The user preference for the size may be determined to be different than the size of the shoe at the product display 500. As a result, the display device 512 may present the shoe in the user's preferred size. The user may be able to see the shoe in various colors as well, for example, via requests at the user device, or via interaction with the product display 500 (e.g., speaking a request to the product display 500 to show the shoe in a camel color, etc.). The display device 512 may present the shoe in the requested color and/or size, as illustrated in a third instance 560. Accordingly, one or more computer systems or remote servers may determine a user interaction with a product at the product display 500, and may determine user preference data for the user. Based at least in part on the user preference data, presentation of product information for the product may be caused at the display device 512 or a user device.

Figure 6:
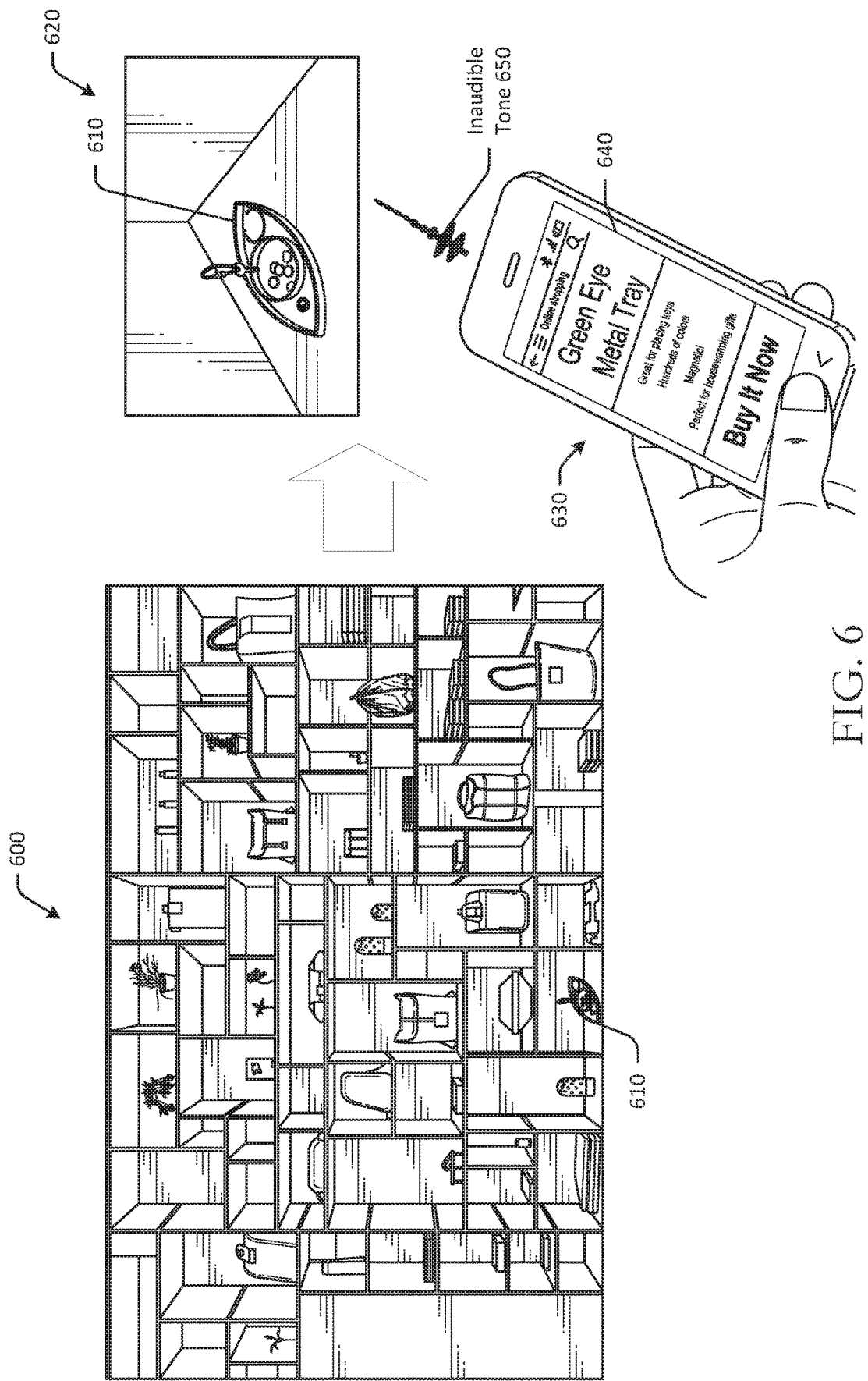
FIG. 6 is a schematic illustration of an example portable interactive product display with customized visual data in accordance with one or more example embodiments of the disclosure.

FIG. 6 is a schematic illustration of an example portable interactive product display 600 with customized visual data in accordance with one or more example embodiments of the disclosure. In FIG. 6, a product display 600 may include a number of products that users can interact with. For example, the product display 600 may include an eye-shaped metal tray 610. One or more speakers positioned at or near the product display 600 may be configured to emit an inaudible tone that carries data. Once decoded, the inaudible tone may cause one or more operations or actions to be executed by a mobile device 630. For example, the inaudible tone may cause the mobile device 630 to open or initiate a mobile application, such as a shopping application. In some embodiments, the mobile device 630 may activate a microphone or otherwise start listening for inaudible tones based at least in part on a location of the mobile device 630. For example, the area about the product display 600 may be geofenced, and once the mobile application and/or the mobile device 630 determines that the mobile device 630 is within the geofenced area (e.g., by comparing GPS coordinates, etc.), the mobile device 630 may begin monitoring for inaudible tones.

To request additional information, in one example, a user may position the mobile device 630 near or in contact with the product, such as near the eye-shaped metal tray 610 as shown in the close-up view 620. The mobile device 630 may output an inaudible tone 650 that may be detected by one or more microphones at the product display 600. If the inaudible tone 650 is determined to be associated with the eye-shaped metal tray 610, the product display 600 may emit another inaudible tone with a product identifier of the eye-shaped metal tray 610, and may cause the mobile device 630 to present a user interface 640 with the eye-shaped metal tray 610. The user can then view additional information regarding the eye-shaped metal tray 610. In some embodiments, to determine that the user is interested in a certain product, a volume of the inaudible tone 650 received from the mobile device 630 may be determined, in order to determine where the volume is loudest. The microphone detecting the loudest volume may be determined to be closest to the mobile device 630. The microphone may be associated with the eye-shaped metal tray 610 or another product, and the user may therefore be determined to be interested in the eye-shaped metal tray 610. In other embodiments, cameras and computer vision, as well as a number of sensors, may be used to determine user interactions and user interest in various products at the product display 600.

Figure 7:
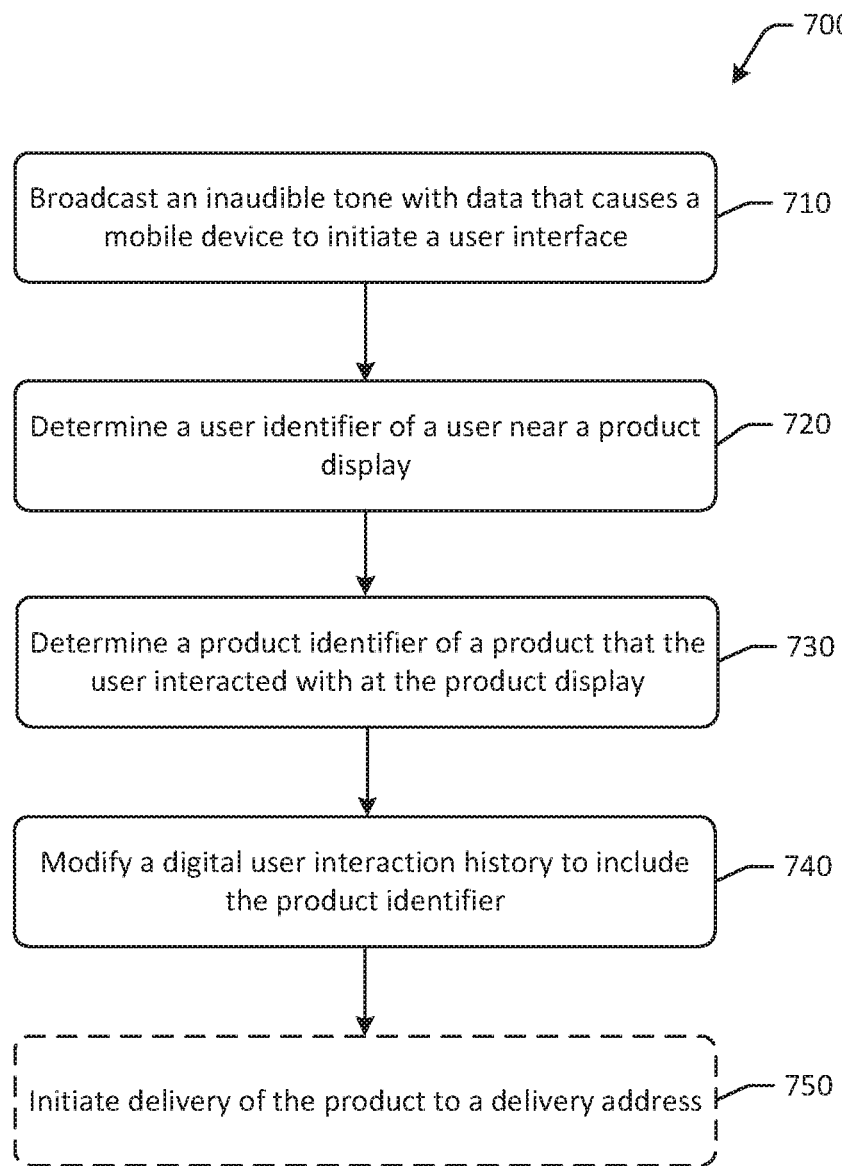
FIG. 7 is a schematic illustration of an example process flow for user identification and user interaction management in accordance with one or more example embodiments of the disclosure.
Figure 8:
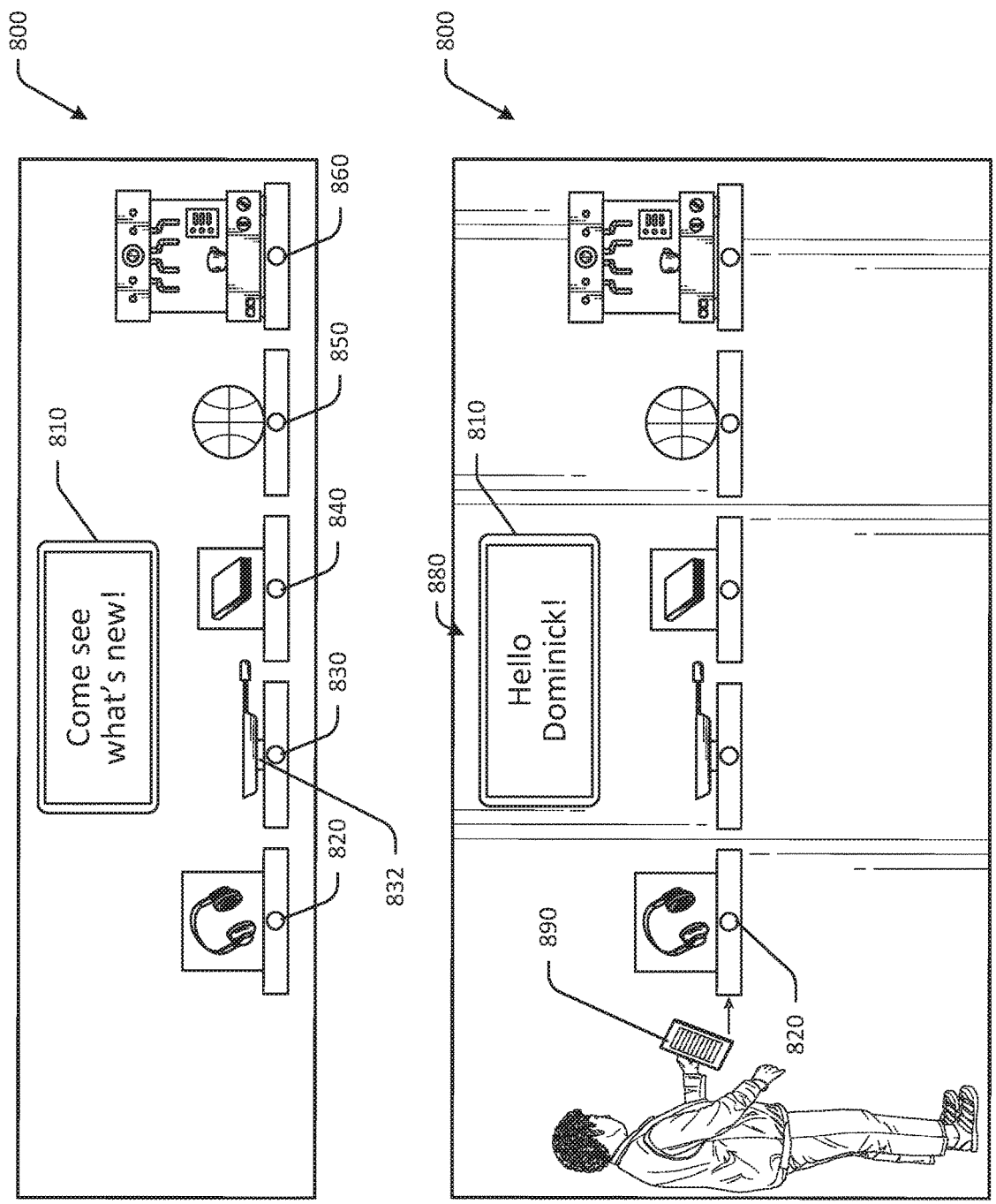
FIG. 8 is a schematic illustration of an example portable interactive product display with a number of microphones and sensors in accordance with one or more example embodiments of the disclosure.

FIG. 7 depicts an example process flow 700 for user identification and user interaction management in accordance with one or more example embodiments of the disclosure. FIG. 8 illustrates an example portable interactive product display 800 with a number of microphones and sensors in accordance with one or more example embodiments of the disclosure. FIG. 8 will be discussed in conjunction with FIG. 7.

At block 710 of the process flow 700, computer-executable instructions stored on a memory of a device may be executed to broadcast an inaudible tone with data that causes a mobile device to initiate a user interface. For example, one or more computer processors coupled to at least one memory may cause a first inaudible tone to be emitted by a speaker. The speaker may be at a product display. The first inaudible tone may be configured to initiate a change in a user interface at a mobile device. In an example, the inaudible tone may include data that causes a mobile application to be initialized or opened at the mobile device. The mobile device may detect the inaudible tone, decode the inaudible tone, and initiate the mobile application and/or change an existing user interface.

FIG. 8 depicts a product wall 800 that includes a number of products and a display device 810. One or more, or each, of the products at the product wall 800 may be associated with a microphone or other electronic component, such as a sensor. For example, headphones may be associated with a first microphone 820, a frying pan may be associated with a second microphone 830, a book may be associated with a third microphone 840, a basketball may be associated with a fourth microphone 850, and an espresso machine may be associated with a fifth microphone 860. The display device 810 may present visual content when no users are near the product wall 800. The product wall 800 may include one or more speakers that broadcasts the first inaudible tone using one or more speakers. The first inaudible tone may be periodically broadcast or triggered after detection of a user device or movement.

At block 720 of the process flow 700, computer-executable instructions stored on a memory of a device may be executed to determine a user identifier of a user near a product display. For example, the inaudible tone, or another inaudible tone, may cause the mobile device to send a device identifier and/or a user identifier to a computer positioned at the product display, or to a remote server. Based at least in part on the information received from the mobile device, the user identifier may be determined. In one example, a second inaudible tone may be determined or otherwise received from the mobile device. The second inaudible tone may be detected, captured, and/or received using a microphone that may be positioned at the product display. The second inaudible tone may include the user identifier of the user.

In FIG. 8, as a user approaches the product wall 800, the user may be detected an identified. In some embodiments, customized content 880 may be presented at the display device 810. For example, the display device 810 may present a welcome notification of "Hello Dominick." The content presented at the display device 810 may be determined based at least in part on a distance of the user from the product wall 800. For example, if the user is a first distance from the product wall 800, the welcome notification may be presented, whereas if the user moves to a second distance closer to the product wall 800 or interacts with a product, user preferred product preferences may be used to present product information. In some embodiments, lighting at the interactive display or product wall 800 may be changed based at least in part on a distance between the product wall 800 and a user. For example, as the user gets closer to the product wall, additional lights may be activated or lighting schemes may be modified. Lighting modes may include an attract lighting mode to attract user attention, a product spotlight mode to highlight products that may be of interest to the user, and so forth. For example, if the presence of a user is detected at the product wall 800, lighting modes may be changed, as well as visual content at the display device 810.

In some embodiments, a speaker at the product display may be configured to broadcast a first inaudible tone having a frequency of greater than or equal to about 18.75 kHz and less than or equal to about 19.2 kHz. The first inaudible tone may include a preamble, a header, and a payload. The first inaudible tone may be ultrasonic. The first inaudible tone may include a first tone identifier and first data that causes a mobile device to initiate a mobile application on the mobile device. The product wall 800 may include one or more microphones, one or more of which may receive an inaudible tone from the mobile device 890 that includes a user identifier of a user from the mobile device 890.

At block 730 of the process flow 700, computer-executable instructions stored on a memory of a device may be executed to determine a product identifier of a product that the user interacted with at the product display. For example, user interactions with products may be determined. When a user interaction is determined with a product, the corresponding product identifier of the product may be determined.

In FIG. 8, in some embodiments, weight sensors, such as load cells, force or pressure sensors, and the like may be positioned underneath products, and may be used to determine when a product has been removed from the product wall 800. For example, a weight sensor 832 may be positioned underneath the frying pan. One or more computer systems at the product wall 800 or a remote server may determine a first change in a weight measurement at the weight sensor 832. The weight sensor 832 may be associated with a specific product, such as the frying pan. Based at least in part on the first change in the weight measurement, the computer system may determine that the product was removed from the product wall 800. The computer system may determine a second change in the weight measurement at the weight sensor 832, and may determine that the product was replaced based at least in part on the second change. The computer system may determine a length of time between the first change and the second change to determine a length of time that the user removed the product. Based at least in part on the length of time, the computer system may determine that the user is interested in the product. For example, if the user removed the product for a threshold length of time, the user may be determined to be interested in the product. The weight measurement change may be used to determine a user interaction of touching the product as well. In some embodiments, the computer system may modify a user profile to indicate user interest in the product, such as the frying pan.

In some embodiments, inaudible tones may be used to determine user interactions. For example, in FIG. 8, a user interaction with a product, such as the headphones, may be determined based at least in part on an inaudible tone received at the first microphone 820. The inaudible tone may be received from a user device 890 associated with the user. The first microphone 820 may be associated with the product. The computer system may determine that a volume of the third inaudible tone satisfies a volume threshold, and may therefore determine that the user interacted with the associated product. For example, the volume of the inaudible tone may need to satisfy a certain decibel threshold, or may need to be relatively higher at a certain microphone relative to other microphones in order to determine that a user interaction with a certain product occurred.

In some embodiments, user interest in a product may be determined based at least in part on a length of time that the user interacted with the product. For example, if it is determined that the length of time satisfies a user interest threshold, which may be an aggregate length of time over a number of sessions, a user profile associated with the user identifier may be modified to indicate that the user is interested in the product.

Inaudible tones may cause additional actions to be performed at the user device 890, such as presentation of an add to cart option, delivery options, product features, and the like. In some embodiments, a user may "tap" or "bump" a mobile device, such as a smartphone or watch, with a product for additional functionality. In such instances, an indication of a physical contact event between the mobile device and an object associated with a second product (or the object itself) may be determined. As a result, a product identifier of the product may be added to a product list, such as a wish list, associated with the user identifier.

At block 740 of the process flow 700, computer-executable instructions stored on a memory of a device may be executed to modify a digital user interaction history to include the product identifier. For example, the digital user interaction history associated with the user identifier may be modified to include the product identifier that the user interacted with. The type of user interaction may also be determined and included in the digital user interaction history. For example, an indication of whether the user viewed the product, picked up the product, a length of time the user viewed or interacted with the product, and so forth may be captured and included in the digital user interaction history or maintained separately.

At optional block 750 of the process flow 700, computer-executable instructions stored on a memory of a device may be executed to initiate delivery of the product to a delivery address. For example, if a user provides an indication to purchase the product, the user may be provided an option to remove the product from the display immediately, or an option to have the product delivered to an address, such as the user's home address. If the user selects the delivery option, the product (or another product the same as the product at the display) may be delivered to the delivery address for the user. A computer system at the product display may initiate the shipment or the delivery of the product to the delivery address. In some embodiments, the delivery address may be automatically determined based at least in part on the user identifier, as well as payment information and other data stored in a user profile. In some embodiments, a purchase transaction for a product may be initiated in a user color preference to be delivered to the delivery address of the user.

In FIG. 8, a purchase may be completed in any suitable manner. For example, if the user decides to purchase the headphones, the computer system or a remote server may initiate a purchase transaction for the headphones. A delivery address associated with the user identifier may be determined, and shipment of a package to the delivery address may be caused. In another example, a determination may be made that the headphones were removed from the interactive display or product wall 800, and the purchase transaction may be completed.

Users may share information about the product wall 800 or the products using social media. For example, an indication to share digital information associated with the first product to one or more digital platforms may be determined, and the computer system or remote server may cause the digital information to be sent to one or more digital platforms.

Additionally, user sentiment may be determined in some embodiments using computer vision and/or one or more facial recognition algorithms to determine a specific user's response or sentiment to certain products and/or content. For example, if a user sentiment is determined to be positive responsive to a certain product (as determined by facial response and/or body posture, etc.), the user may be determined to be interested in the product. In contrast, if the user sentiment for a product is determined to be negative, a different product may be presented to the user at a display device, and the user may be prevented from being targeted with content related to the product in the future.

Figure 9:
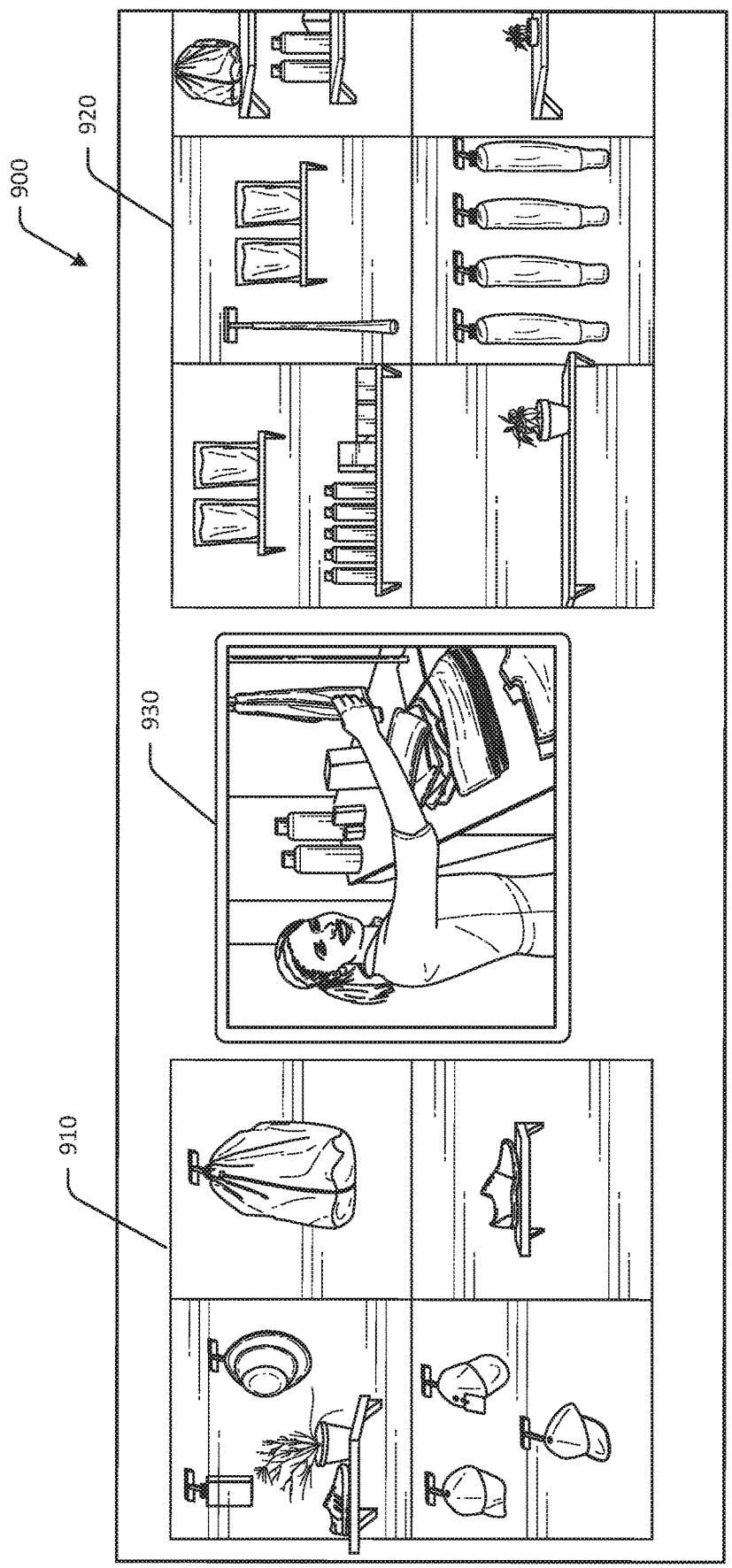
FIG. 9 is a schematic illustration of an example use case for an unmanned product display in accordance with one or more example embodiments of the disclosure.

FIG. 9 is a schematic illustration of an example use case for an unmanned product display 900 in accordance with one or more example embodiments of the disclosure. In the example of FIG. 9, a boutique or product wall may have products for sale, but may be unmanned. Visitors to the product wall may be able to view a proprietor of the store or wall as they negotiate deals or find new products to bring to the product wall. For example, the product wall may include outdoor products 910, indoor products 920, and a display device 930 that streams video of the store owner or proprietor as they find new products to bring back to the store or product wall. As a result, users can watch as new products are found and can anticipate new products that will be available at the product wall, in a reality television or similar format. In some embodiments, store owners or others can video chat with users in the store using the display device 930, so the store or product wall can remain open at all times and the owner can drop in as needed.

One or more operations of the methods, process flows, or use cases of FIGS. 1-9 may have been described above as being performed by a user device, or more specifically, by one or more program module(s), applications, or the like executing on a device. It should be appreciated, however, that any of the operations of the methods, process flows, or use cases of FIGS. 1-9 may be performed, at least in part, in a distributed manner by one or more other devices, or more specifically, by one or more program module(s), applications, or the like executing on such devices. In addition, it should be appreciated that the processing performed in response to the execution of computer-executable instructions provided as part of an application, program module, or the like may be interchangeably described herein as being performed by the application or the program module itself or by a device on which the application, program module, or the like is executing. While the operations of the methods, process flows, or use cases of FIGS. 1-9 may be described in the context of the illustrative devices, it should be appreciated that such operations may be implemented in connection with numerous other device configurations.

The operations described and depicted in the illustrative methods, process flows, and use cases of FIGS. 1-9 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIGS. 1-9 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Illustrative Device Architecture

Figure 10:
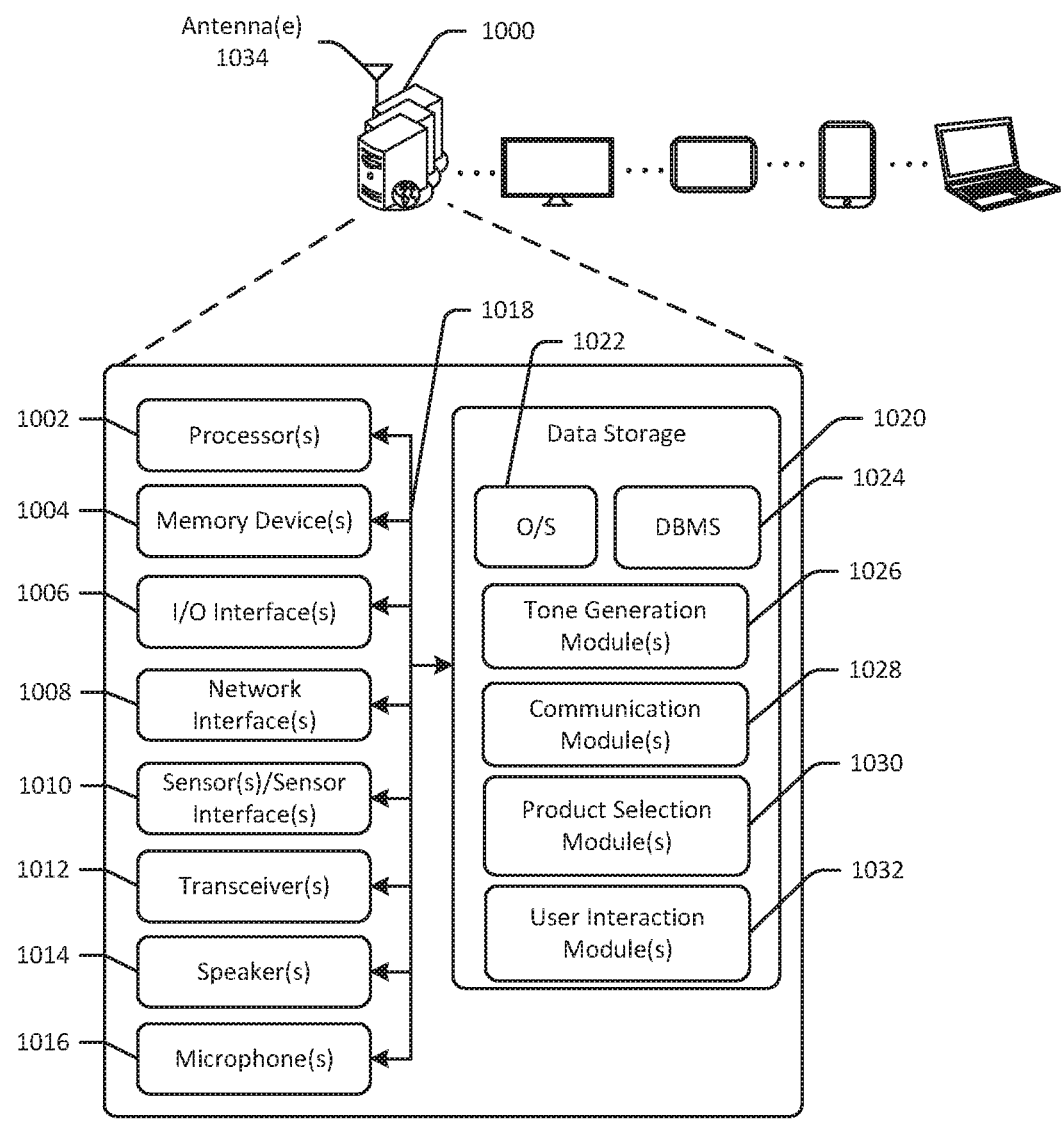
FIG. 10 is a schematic block diagram of an illustrative device in accordance with one or more example embodiments of the disclosure.

FIG. 10 is a schematic block diagram of an illustrative remote server 1000 in accordance with one or more example embodiments of the disclosure. The remote server 1000 may include any suitable computing device capable of receiving and/or generating data including, but not limited to, a mobile device such as a smartphone, tablet, e-reader, wearable device, or the like; a desktop computer; a laptop computer; a content streaming device; a set-top box; or the like. The remote server 1000 may correspond to an illustrative device configuration for the devices of FIGS. 1-9.

The remote server 1000 may be configured to communicate via one or more networks with one or more servers, user devices, or the like. In some embodiments, a single remote server or single group of remote servers may be configured to perform more than one type of voice processing and/or audio content streaming functionality.

Example network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the remote server 1000 may include one or more processors (processor(s)) 1002, one or more memory devices 1004 (generically referred to herein as memory 1004), one or more input/output (I/O) interface(s) 1006, one or more network interface(s) 1008, one or more sensors or sensor interface(s) 1010, one or more transceivers 1012, one or more optional speakers 1014, one or more optional microphones 1016, and data storage 1020. The remote server 1000 may further include one or more buses 1018 that functionally couple various components of the remote server 1000. The remote server 1000 may further include one or more antenna(e) 1034 that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, and so forth. These various components will be described in more detail hereinafter.

The bus(es) 1018 may include at least one of a system bus, a memory bus, an address bus, or a message bus, and may permit exchange of information (e.g., data (including computer-executable code), signaling, etc.) between various components of the remote server 1000. The bus(es) 1018 may include, without limitation, a memory bus or a memory controller, a peripheral bus, an accelerated graphics port, and so forth. The bus(es) 1018 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 1004 of the remote server 1000 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 1004 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 1004 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 1020 may include removable storage and/or non-removable storage including, but not limited to, magnetic storage, optical disk storage, and/or tape storage. The data storage 1020 may provide non-volatile storage of computer-executable instructions and other data. The memory 1004 and the data storage 1020, removable and/or non-removable, are examples of computer-readable storage media (CRSM) as that term is used herein.

The data storage 1020 may store computer-executable code, instructions, or the like that may be loadable into the memory 1004 and executable by the processor(s) 1002 to cause the processor(s) 1002 to perform or initiate various operations. The data storage 1020 may additionally store data that may be copied to memory 1004 for use by the processor(s) 1002 during the execution of the computer-executable instructions. Moreover, output data generated as a result of execution of the computer-executable instructions by the processor(s) 1002 may be stored initially in memory 1004, and may ultimately be copied to data storage 1020 for non-volatile storage.

More specifically, the data storage 1020 may store one or more operating systems (O/S) 1022; one or more database management systems (DBMS) 1024; and one or more program module(s), applications, engines, computer-executable code, scripts, or the like such as, for example, one or more tone generation module(s) 1026, one or more communication module(s) 1028, one or more product selection module(s) 1030, and/or one or more user interaction module(s) 1032. Some or all of these module(s) may be sub-module(s). Any of the components depicted as being stored in data storage 1020 may include any combination of software, firmware, and/or hardware. The software and/or firmware may include computer-executable code, instructions, or the like that may be loaded into the memory 1004 for execution by one or more of the processor(s) 1002. Any of the components depicted as being stored in data storage 1020 may support functionality described in reference to correspondingly named components earlier in this disclosure.

The data storage 1020 may further store various types of data utilized by components of the remote server 1000. Any data stored in the data storage 1020 may be loaded into the memory 1004 for use by the processor(s) 1002 in executing computer-executable code. In addition, any data depicted as being stored in the data storage 1020 may potentially be stored in one or more datastore(s) and may be accessed via the DBMS 1024 and loaded in the memory 1004 for use by the processor(s) 1002 in executing computer-executable code. The datastore(s) may include, but are not limited to, databases (e.g., relational, object-oriented, etc.), file systems, flat files, distributed datastores in which data is stored on more than one node of a computer network, peer-to-peer network datastores, or the like. In FIG. 10, the datastore(s) may include, for example, purchase history information, device identifier information, user profile information, and other information.

The processor(s) 1002 may be configured to access the memory 1004 and execute computer-executable instructions loaded therein. For example, the processor(s) 1002 may be configured to execute computer-executable instructions of the various program module(s), applications, engines, or the like of the remote server 1000 to cause or facilitate various operations to be performed in accordance with one or more embodiments of the disclosure. The processor(s) 1002 may include any suitable processing unit capable of accepting data as input, processing the input data in accordance with stored computer-executable instructions, and generating output data. The processor(s) 1002 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 1002 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 1002 may be capable of supporting any of a variety of instruction sets.

Referring now to functionality supported by the various program module(s) depicted in FIG. 10, the tone generation module(s) 1026 may include computer-executable instructions, code, or the like that responsive to execution by one or more of the processor(s) 1002 may perform functions including, but not limited to, communicating with one or more devices, for example, via wired or wireless communication, communicating with remote servers, communicating with remote datastores, generating audio content including inaudible tones, presenting audio via the speakers 1014, sending data to one or more devices, causing presentation of digital content including audio content and visual content, and the like.

The communication module(s) 1028 may include computer-executable instructions, code, or the like that responsive to execution by one or more of the processor(s) 1002 may perform functions including, but not limited to, communicating with one or more devices, for example, via wired or wireless communication, communicating with remote servers, communicating with remote datastores, sending or receiving notifications or inaudible tones, communicating with cache memory data, and the like.

The product selection module(s) 1030 may include computer-executable instructions, code, or the like that responsive to execution by one or more of the processor(s) 1002 may perform functions including, but not limited to, determining display locations, recommending display locations, determining local user data, determining local user preferences, identifying local users, determining products for various displays, and the like.

The user interaction module(s) 1032 may include computer-executable instructions, code, or the like that responsive to execution by one or more of the processor(s) 1002 may perform functions including, but not limited to, monitoring user interaction data at user devices or product displays, determining real-time or near real-time user interaction metrics for a number of different products at displays, receiving user interaction data from a plurality of devices, determining user action events and frequencies of occurrences, defining user action events, determining product identifiers, managing and/or modifying digital user interaction or browsing history data, and the like.

Referring now to other illustrative components depicted as being stored in the data storage 1020, the O/S 1022 may be loaded from the data storage 1020 into the memory 1004 and may provide an interface between other application software executing on the remote server 1000 and hardware resources of the remote server 1000. More specifically, the O/S 1022 may include a set of computer-executable instructions for managing hardware resources of the remote server 1000 and for providing common services to other application programs (e.g., managing memory allocation among various application programs). In certain example embodiments, the 0/S 1022 may control execution of the other program module(s) to dynamically enhance characters for content rendering. The O/S 1022 may include any operating system now known or which may be developed in the future including, but not limited to, any server operating system, any mainframe operating system, or any other proprietary or non-proprietary operating system.

The DBMS 1024 may be loaded into the memory 1004 and may support functionality for accessing, retrieving, storing, and/or manipulating data stored in the memory 1004 and/or data stored in the data storage 1020. The DBMS 1024 may use any of a variety of database models (e.g., relational model, object model, etc.) and may support any of a variety of query languages. The DBMS 1024 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like. In those example embodiments in which the remote server 1000 is a mobile device, the DBMS 1024 may be any suitable light-weight DBMS optimized for performance on a mobile device.

Referring now to other illustrative components of the remote server 1000, the input/output (I/O) interface(s) 1006 may facilitate the receipt of input information by the remote server 1000 from one or more I/O devices as well as the output of information from the remote server 1000 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the remote server 1000 or may be separate. The I/O devices may further include, for example, any number of peripheral devices such as data storage devices, printing devices, and so forth.

The I/O interface(s) 1006 may also include an interface for an external peripheral device connection such as universal serial bus (USB), FireWire, Thunderbolt, Ethernet port or other connection protocol that may connect to one or more networks. The I/O interface(s) 1006 may also include a connection to one or more of the antenna(e) 1034 to connect to one or more networks via a wireless local area network (WLAN) (such as Wi-Fi) radio, Bluetooth, ZigBee, and/or a wireless network radio, such as a radio capable of communication with a wireless communication network such as a Long Term Evolution (LTE) network, WiMAX network, 3G network, ZigBee network, etc.

The remote server 1000 may further include one or more network interface(s) 1008 via which the remote server 1000 may communicate with any of a variety of other systems, platforms, networks, devices, and so forth. The network interface(s) 1008 may enable communication, for example, with one or more wireless routers, one or more host servers, one or more web servers, and the like via one or more of networks.

The antenna(e) 1034 may include any suitable type of antenna depending, for example, on the communications protocols used to transmit or receive signals via the antenna(e) 1034. Non-limiting examples of suitable antennas may include directional antennas, non-directional antennas, dipole antennas, folded dipole antennas, patch antennas, multiple-input multiple-output (MIMO) antennas, or the like. The antenna(e) 1034 may be communicatively coupled to one or more transceivers 1012 or radio components to which or from which signals may be transmitted or received.

As previously described, the antenna(e) 1034 may include a cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like.

The antenna(e) 1034 may additionally, or alternatively, include a Wi-Fi antenna configured to transmit or receive signals in accordance with established standards and protocols, such as the IEEE 802.11 family of standards, including via 2.4 GHz channels (e.g., 802.11b, 802.11g, 802.11n), 5 GHz channels (e.g., 802.11n, 802.11ac), or 60 GHz channels (e.g., 802.11ad). In alternative example embodiments, the antenna(e) 1034 may be configured to transmit or receive radio frequency signals within any suitable frequency range forming part of the unlicensed portion of the radio spectrum.

The antenna(e) 1034 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The transceiver(s) 1012 may include any suitable radio component(s) for—in cooperation with the antenna(e) 1034—transmitting or receiving radio frequency (RF) signals in the bandwidth and/or channels corresponding to the communications protocols utilized by the remote server 1000 to communicate with other devices. The transceiver(s) 1012 may include hardware, software, and/or firmware for modulating, transmitting, or receiving—potentially in cooperation with any of antenna(e) 1034—communications signals according to any of the communications protocols discussed above including, but not limited to, one or more Wi-Fi and/or Wi-Fi direct protocols, as standardized by the IEEE 802.11 standards, one or more non-Wi-Fi protocols, or one or more cellular communications protocols or standards. The transceiver(s) 1012 may further include hardware, firmware, or software for receiving GNSS signals. The transceiver(s) 1012 may include any known receiver and baseband suitable for communicating via the communications protocols utilized by the remote server 1000. The transceiver(s) 1012 may further include a low noise amplifier (LNA), additional signal amplifiers, an analog-to-digital (A/D) converter, one or more buffers, a digital baseband, or the like.

The sensor(s)/sensor interface(s) 1010 may include or may be capable of interfacing with any suitable type of sensing device such as, for example, inertial sensors, force sensors, thermal sensors, and so forth. Example types of inertial sensors may include accelerometers (e.g., MEMS-based accelerometers), gyroscopes, and so forth.

The optional speaker(s) 1014 may be any device configured to generate audible sound. The optional microphone(s) 1016 may be any device configured to receive analog sound input or voice data.

It should be appreciated that the program module(s), applications, computer-executable instructions, code, or the like depicted in FIG. 10 as being stored in the data storage 1020 are merely illustrative and not exhaustive and that processing described as being supported by any particular module may alternatively be distributed across multiple module(s) or performed by a different module. In addition, various program module(s), script(s), plug-in(s), Application Programming Interface(s) (API(s)), or any other suitable computer-executable code hosted locally on the remote server 1000, and/or hosted on other computing device(s) accessible via one or more networks, may be provided to support functionality provided by the program module(s), applications, or computer-executable code depicted in FIG. 10 and/or additional or alternate functionality. Further, functionality may be modularized differently such that processing described as being supported collectively by the collection of program module(s) depicted in FIG. 10 may be performed by a fewer or greater number of module(s), or functionality described as being supported by any particular module may be supported, at least in part, by another module. In addition, program module(s) that support the functionality described herein may form part of one or more applications executable across any number of systems or devices in accordance with any suitable computing model such as, for example, a client-server model, a peer-to-peer model, and so forth. In addition, any of the functionality described as being supported by any of the program module(s) depicted in FIG. 10 may be implemented, at least partially, in hardware and/or firmware across any number of devices.

It should further be appreciated that the remote server 1000 may include alternate and/or additional hardware, software, or firmware components beyond those described or depicted without departing from the scope of the disclosure. More particularly, it should be appreciated that software, firmware, or hardware components depicted as forming part of the remote server 1000 are merely illustrative and that some components may not be present or additional components may be provided in various embodiments. While various illustrative program module(s) have been depicted and described as software module(s) stored in data storage 1020, it should be appreciated that functionality described as being supported by the program module(s) may be enabled by any combination of hardware, software, and/or firmware. It should further be appreciated that each of the above-mentioned module(s) may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other module(s). Further, one or more depicted module(s) may not be present in certain embodiments, while in other embodiments, additional module(s) not depicted may be present and may support at least a portion of the described functionality and/or additional functionality. Moreover, while certain module(s) may be depicted and described as sub-module(s) of another module, in certain embodiments, such module(s)

may be provided as independent module(s) or as submodule(s) of other module(s).

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:
1. A method comprising:
broadcasting, by a speaker at a product display, a first inaudible tone having a frequency of greater than or equal to about 18.75 kHz and less than or equal to about 19.2 kHz, the first inaudible tone comprising a first tone identifier and first data that causes a mobile device to initiate a mobile application on the mobile device;
receiving, by a first microphone at the product display, a second inaudible tone comprising a user identifier of a user from the mobile device;
determining that the mobile device is within a first distance of the product display;
causing a lighting device at the product display to activate;

receiving, by the first microphone, a third inaudible tone from the mobile device;
determining that the mobile device is within a second distance of the product display, wherein the second distance is less than the first distance;
causing a display device at the product display to present a welcome notification for the user;
receiving, by a second microphone at the product display, a fourth inaudible tone from the mobile device, wherein the second microphone is associated with a product;
determining that a volume of the fourth inaudible tone satisfies a volume threshold;
emitting a fifth inaudible tone using the speaker, wherein the fifth inaudible tone causes the mobile device to present product information for the product;
determining that a color of the product is different than a user color preference for the user;
causing the display device to present the product in the user color preference;
receiving a sixth inaudible tone from the mobile device, the sixth inaudible tone comprising second data indicative of a purchase initiation;
determining a delivery address for the user identifier; and
initiating a purchase transaction for the product in the user color preference to be delivered to the delivery address.

2. The method of claim 1, further comprising:
determining a first change in a weight measurement at a weight sensor, wherein the weight sensor is associated with the product;
determining that the product was removed from the product display using the first change in the weight measurement;
determining a second change in the weight measurement at the weight sensor;
determining that the product was replaced;
determining a length of time between the first change and the second change;
determining that the user is interested in the product using the length of time; and
modifying a user profile to indicate user interest in the product using the user identifier.

3. The method of claim 1, wherein the product is a first product, the method further comprising:
determining a user interaction with a second product;
determining that the user is interested in the second product;
causing presentation of product information for the second product at the display device; and
emitting a seventh inaudible tone using the speaker, wherein the fifth inaudible tone causes the mobile device to present an add to cart option for the second product.

4. The method of claim 1, wherein the product is a first product, the method further comprising:
determining an indication of a physical contact event between the mobile device and an object associated with a second product; and
adding a product identifier of the second product to a product list associated with the user identifier.

5. A method comprising:
causing, by one or more computer processors coupled to at least one memory, a first inaudible tone to be emitted by a speaker, the first inaudible tone configured to initiate a change in a user interface at a mobile device;
determining a second inaudible tone from a user device using a microphone, the second inaudible tone comprising a user identifier of a user;
determining a user interaction with a product at a product display;
determining user preference data; and
causing presentation of product information for the product using the user preference data.

6. The method of claim 5, further comprising:
determining a digital user interaction history using the user identifier; and
modifying the digital user interaction history to include a product identifier of the product.

7. The method of claim 5, further comprising:
causing a product purchase option to be presented at the mobile device;
determining that the user would like to purchase the product; and
initiating a purchase transaction using a product identifier of the product and the user identifier.

8. The method of claim 5, wherein determining the user interaction with the product at the product display comprises:
determining a third inaudible tone at a microphone associated with the product; and
determining that a volume of the third inaudible tone satisfies a volume threshold.

9. The method of claim 5, further comprising:
determining a length of time that the user interacted with the product;
determining that the length of time satisfies a user interest threshold; and
modifying a user profile associated with the user identifier to indicate that the user is interested in the product.

10. The method of claim 5, wherein the product is a first product, the method further comprising:
determining an indication of a physical contact event between the mobile device and an object associated with a second product; and
adding a product identifier of the second product to a product list associated with the user identifier.

11. The method of claim 5, further comprising:
determining that the product was removed from the product display; and
initiating a purchase transaction using a product identifier of the product and the user identifier.

12. The method of claim 5, further comprising:
causing a third inaudible tone to be emitted by the speaker, wherein the third inaudible tone causes the mobile device to present a user interface with a selectable purchase option.

13. The method of claim 5, further comprising:
determining that the mobile device is within a distance of the product display; and
causing customized visual data to be presented at a display device of the product display based at least in part on the user preference data.

14. The method of claim 5, further comprising:
determining a user color preference using the user preference data;
wherein causing presentation of product information for the product using the user preference data comprises causing presentation of the product in the user color preference.

15. The method of claim 5, wherein causing presentation of product information for the product using the user preference data comprises causing presentation of product information for the product at a display device of the product display using the user preference data.

16. A device comprising:
at least one memory that stores computer-executable instructions; and
at least one processor configured to access the at least one memory and execute the computer-executable instructions to:
cause a first inaudible tone to be emitted by a speaker, the first inaudible tone configured to initiate a change in a user interface at a mobile device;
determine a second inaudible tone from a user device using a microphone, the second inaudible tone comprising a user identifier of a user;
determine a user interaction with a product at a product display;
determine user preference data; and
cause presentation of product information for the product using the user preference data.

17. The device of claim 16, wherein the at least one processor is further configured to access the at least one memory and execute the computer-executable instructions to:
determine a digital user interaction history using the user identifier; and
modify the digital user interaction history to include a product identifier of the product.

18. The device of claim 16, wherein the at least one processor is further configured to access the at least one memory and execute the computer-executable instructions to:
cause a product purchase option to be presented at the mobile device;
determine that the user would like to purchase the product; and
initiate a purchase transaction using a product identifier of the product and the user identifier.

19. The device of claim 16, wherein the at least one processor is further configured to access the at least one memory and execute the computer-executable instructions to:
determine a length of time that the user interacted with the product;
determine that the length of time satisfies a user interest threshold; and
modify a user profile associated with the user identifier to indicate that the user is interested in the product.

20. The device of claim 16, wherein the at least one processor is further configured to access the at least one memory and execute the computer-executable instructions to:
determine that the product was removed from the product display; and
initiate a purchase transaction using a product identifier of the product and the user identifier.

* * * * *